United States Patent [19]
Eguchi et al.

[11] Patent Number: 5,418,810
[45] Date of Patent: May 23, 1995

[54] LASER LIGHT BEAM GENERATING APPARATUS USING AN ELECTROMAGNETIC ACTUATOR FOR REFLECTOR POSITIONING

[75] Inventors: Naoya Eguchi, Tokyo; Michio Oka, Kanagawa, both of Japan

[73] Assignee: Sony Corporation, Tokyo, Japan

[21] Appl. No.: 269,657

[22] Filed: Jun. 30, 1994

Related U.S. Application Data

[62] Division of Ser. No. 24,627, Mar. 1, 1993, Pat. No. 5,367,531.

[30] Foreign Application Priority Data

Mar. 2, 1992 [JP] Japan .................. 4-078753

[51] Int. Cl.⁶ .................. H01S 3/139; H01S 3/086
[52] U.S. Cl. .................. 372/98; 372/107; 372/22; 372/32; 372/97
[58] Field of Search .................. 372/18, 19, 22, 32, 372/98, 99, 97, 107

[56] References Cited

U.S. PATENT DOCUMENTS

| | | | |
|---|---|---|---|
| 4,594,715 | 6/1986 | Kindlenberg | 372/32 |
| 4,845,718 | 7/1989 | Pistoresi | 372/18 |
| 4,939,739 | 7/1990 | Hobart et al. | 372/107 |
| 5,018,150 | 5/1991 | Wojnarowski et al. | 372/9 |
| 5,253,198 | 10/1993 | Birge et al. | 365/106 |
| 5,367,531 | 11/1994 | Eguchi et al. | 372/98 |

OTHER PUBLICATIONS

M. Oka & S. Kubota, "Second-Harmonic Generation Green Laser for Higher-Density Optical Disks," *Japanese Journal of Applied Physics*, vol. 31 (1992) Feb., Pt. 1, No. 2b, pp. 513–518.

*Primary Examiner*—Rodney B. Bovernick
*Assistant Examiner*—Robert McNutt
*Attorney, Agent, or Firm*—Limbach & Limbach

[57] ABSTRACT

A laser light beam generating apparatus includes at least one light beam source, first and second reflectors, a non-linear optical crystal element and an actuator. The light beam source emits a light beam. The non-linear optical crystal element is provided between the first reflector and the second reflector. A light beam emitted from the light beam source is incident on the non-linear optical crystal element through the first reflector. The actuator actuates at least one of the first and second reflectors along an optical axis of the light beam emitted from the light beam source.

4 Claims, 14 Drawing Sheets

LASER LIGHT BEAM GENERATING APPARATUS USING AN ELECTROMAGNETIC ACTUATOR FOR REFLECTOR POSITIONING

This is a divisional of application Ser. No. 08/024,627, filed Mar. 1, 1993 U.S. Pat. No. 5,367,537.

BACKGROUND

1. Field of the Invention

This invention relates to a laser light beam generating apparatus. More particularly, the present of invention relates to a laser light beam generating apparatus in which a laser light beam converted wavelength is generated by a non-linear optical crystal element.

2. Background of the Invention

It has hitherto been proposed to realize wavelength conversion by taking advantage of the high power density within a resonator. For example, second harmonic generation (SHG) is often achieved by placing a non-linear optical crystal in an external resonator in an attempt to improve the efficiency of the wavelength conversion.

As an SHG used the non-linear optical crystal element providing the resonator, the resonator which includes at least a pair of mirrors, a laser medium and a non-linear optical crystal element is known. In this resonator, the laser medium and the non-linear optical crystal element are provided between the pair of mirrors. With this type of the laser light beam generating apparatus, the second harmonic laser light beam is taken out efficiently by phase matching the second harmonic laser light beam with respect to the laser light beam of the fundamental wavelength by a non-linear optical crystal element provided within the resonator.

There is also known an external resonant method according to which a laser light beam from a laser light source is introduced into an external resonator as laser light beam of a fundamental wavelength and propagated through a non-linear optical crystal element back and forth for a resonant operation to generate a second harmonic laser light beam. In the external resonant method, the finesse value of the resonator, corresponding to a Q-value of resonation, is set to a larger value of about 100 to 1000 to set the light density within the resonator to a value hundreds of times as large as the incident light density. As a result, this type resonator can take advantage effectively of non-linear effects of the non-linear optical crystal element within the resonator.

Meanwhile, for producing laser light beams of second or higher harmonics or so-called sum frequency according to the external resonant method, it is necessary to realize extremely fine position control of limiting changes or errors of the optical path length of the resonator to less than 1/1000 or 1/10000 of the wavelength, that is less than 1 Å.

The conventional practice in limiting the resonator length has been to have the reflective mirrors of the resonator supported by stacked piezoelectric elements by so-called PZT and to feed an error signal proportional to changes in the resonator length back to the stacked piezoelectric elements to complete a servo loop for automatically controlling and stabilizing the resonator length.

In general, piezoelectric elements have multiple resonance at intervals of several to tens of kilohertz frequencies and have phase delay over the entire frequency range due to self capacitance. As a result, it is difficult to spread frequency range of the servo range to several kilohertz. Since the stacked piezoelectric elements are in need of a high driving voltage of hundreds to thousands of volts the driving electric circuit is complicated and expensive.

SUMMARY OF THE INVENTION

It is, therefore, an object of the present invention to provide a laser light beam generating apparatus to resolve above-described problem.

It is an another object of the present invention to provide a laser light beam generating apparatus to improve a control operation of limiting changes or errors of the optical path length of the resonator.

According to a first embodiment of the present invention, there is provided a laser light beam generating apparatus including at least one light beam source, a first reflector, a second reflector, a non-linear optical crystal element and an actuator. The light beam source emits a light beam. The non-linear optical crystal element is provided between the first and second reflectors. A light beam is incident on the non-linear optical crystal element through the first reflector. The actuator actuates at least one of the first and second reflectors along an optical axis of the light beam emitted from the light beam source.

According to a second embodiment of the present invention, there is provided a laser light beam generating apparatus having at least one light beam source, a first resonator, a second resonator and an actuator. The first resonator includes first and second reflectors and a laser medium into which the pumping light beam is incident from the light beam source through the first reflector. The second resonator includes third and fourth reflectors and a non-linear optical crystal element in which the light beam from the first resonator is incident through the third reflector. The actuator actuates at least one of the first, second, third and fourth reflectors along an optical axis of the light emitted from the first resonator.

Since an electromagnetic actuator is employed as a driver for controlling the optical path length of the resonator with high accuracy, the servo range may be increased to tens of kilohertz to permit stable control and highly efficient wavelength conversion. Since a low driving current for the electromagnetic actuator suffices, it becomes possible to simplify the circuitry and to reduce production costs.

DESCRIPTION OF THE PREFERRED EMBODIMENTS

The invention will be more readily understood with reference to the accompanying drawing, wherein.

DESCRIPTION OF THE PREFERRED EMBODIMENTS

Figure 1:
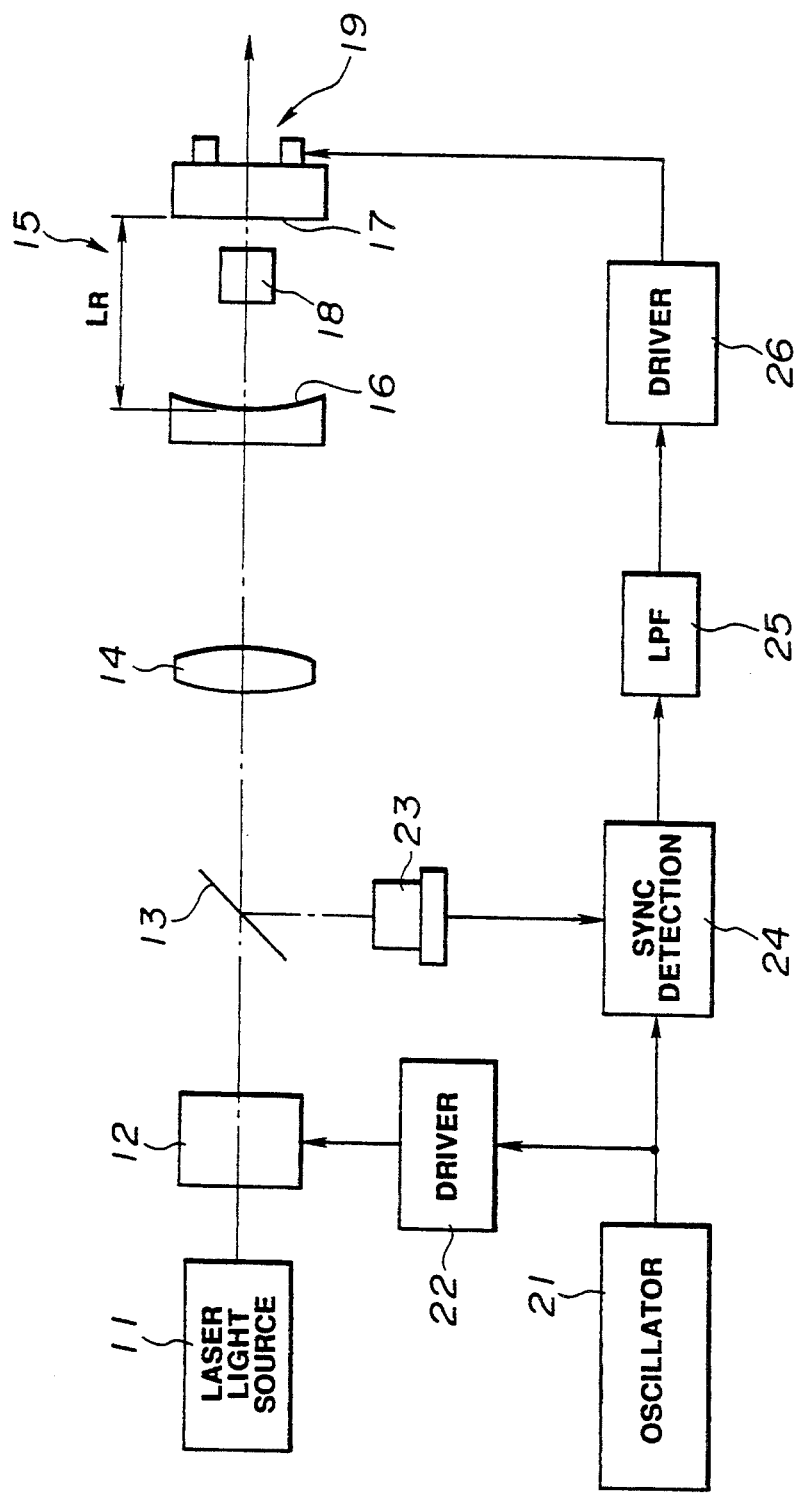
FIG. 1 is a schematic block diagram showing an embodiment of a laser light generating apparatus according to the present invention.

FIG. 1 shows, in a schematic block diagram of an embodiment of the laser light beam generating apparatus according to the present invention.

Referring to FIG. 1, a laser light beam of a fundamental wavelength is emitted from a laser light source 11, such as a semiconductor laser device, e.g. a laser diode, or a second harmonic generating (SHG) laser light source device. The laser light beam of the fundamental wavelength is phase modulated by a phase modulator 12 employing an electro-optical (EO) device or an acoustic-optical (AO) device before being incident on an external resonator 15 via an optical element 13 for detecting the reflected light beam from the resonator 15 and a light converging lens 14. The external resonator 15 is made up of a reflecting surface 16 of a concave mirror, a reflecting surface 17 of a plane mirror and a non-linear optical crystal element 18 interposed therebetween. The state of resonance is produced when the optical path length $L_R$ between the reflecting surfaces 16, 17 of the resonator 15 is a preset length and the optical path phase difference $\Delta$ is an integer number times $2\pi$ with the reflection and the phase of reflection being acutely changed near the resonance phase. At least one of the reflective surfaces 16, 17 of the resonator 15, for example, the reflective surface 17, is adapted for being driven along the optical axis by electromagnetic actuator 19.

If an SHG laser light source device is used as the laser light source 11 for generating a single-mode laser light beam of the wavelength of 532 nm which is supplied to the external resonator 15, the non-linear optical crystal element 18 of barium borate (BBO) is used in the resonator 15 and, by taking advantage of its non-linear optical effects, a laser light beam of the wavelength of 266 nm, which is the second harmonic wave of the input laser light beam of 532 nm (or the fourth harmonic wave if the input light beam is the SHG laser light beam) is generated. The reflective surface 16 of the concave mirror of the external resonator 15 is a dichroic mirror which reflects substantially all of the input light beam of the wavelength of 532 nm, while the reflective surface 17 of the plane mirror is a dichroic mirror reflecting substantially all of the input light beam and transmitting substantially all of the output light beam having the wavelength of 266 nm.

An oscillator 21 outputs a modulating signal with e.g. a frequency $fm=10$ MHz for driving the optical phase modulator 12 to phase modulator 12 via driver 22. The reflected or return laser light beam transmitted to resonator 15 is detected via reflective surface 13 and a photodetector 23, such as a photodiode. The reflected light beam detection signal is transmitted to a synchronous detection circuit 24. Modulating signals from oscillator 21 are supplied, if necessary, after waveshaping, phase delaying, etc. to the synchronous detection circuit 24, and multiplied by the reflected light detection signal, for synchronous detection. Detected output signals from the synchronous detection circuit 24 are supplied via a low-pass filter (LPF) 25, an output of which is a resonator optical length error signal as later explained. This error signal is transmitted to a driver 26, a driving output signal of which actuates the actuator 19 for shifting the reflective surface 17 along the optical axis by way of a servo control for reducing the error signal to zero. In this manner, the optical path length $L_R$ of the external resonator 12 is controlled to be a length corresponding to a local minimum of a reflection curve (resonant point).

The electromagnetic actuator 19 may be a so-called voice coil driving type actuator and the double resonance frequency can be rendered equal to tens of KHz to 100 KHz or higher. As the servo loop resonance frequency is raised, and phase deviations are minimized, the servo range (cut-off frequency) can be increased to e.g. 20 KHz or tens of KHz. Since a low driving current of tens to hundreds of milliamperes suffices for driving the electromagnetic actuator 19, the driving electric circuit may be simplified and rendered inexpensive. Consequently, it becomes possible to provide, in a method for effectively utilizing nonlinear effects employing the external laser resonator method, an inexpensive system for stably suppressing changes in the resonator length to less than 1/1000 to 1/10000 of a wavelength, that is to less than 1 Å.

The principle of introduction of a laser light into the external resonator 15, or a so-called Fabry-Perot resonator, and error detection, is explained. Such a resonator is brought into a resonant state when the optical path phase difference $\Delta$ is equal to an integer number times $2\pi$ with the reflection phase being acutely changed near the resonant phase. Frequency control of the resonator by taking advantage of the phase changes is disclosed for example in "Laser Phase and Frequency Stabilization Using an Optical Resonator" by R. W. P. Drever et al., Applied Physics-B 31.97–105 (1983). The principle of detection of the error signal by this technique is hereinafter explained.

Figure 2:
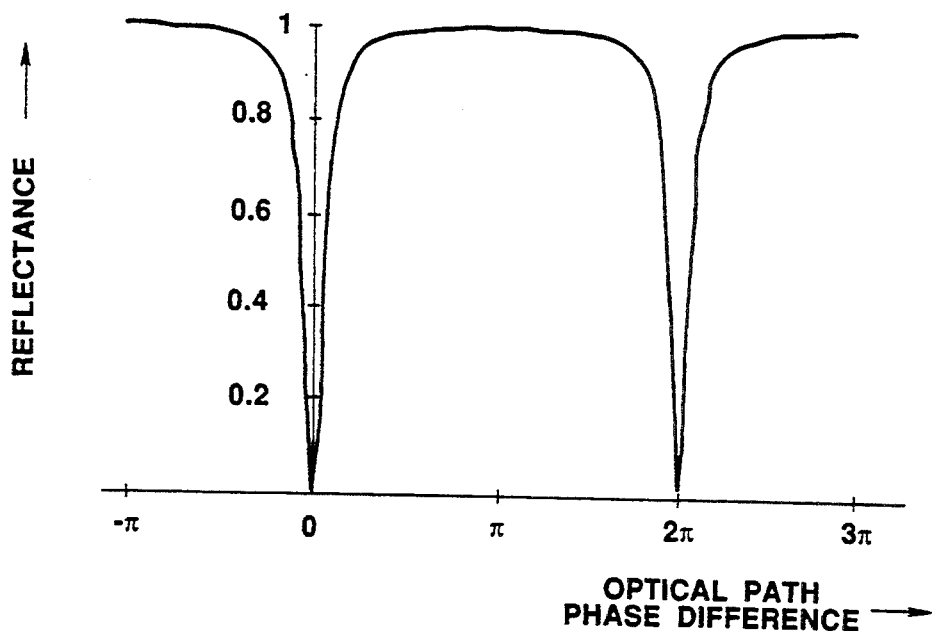
FIG. 2 is a graph showing changes in the power reflection with respect to the optical path phase difference of a resonator employed in the embodiment shown in FIG. 1.
Figure 3:
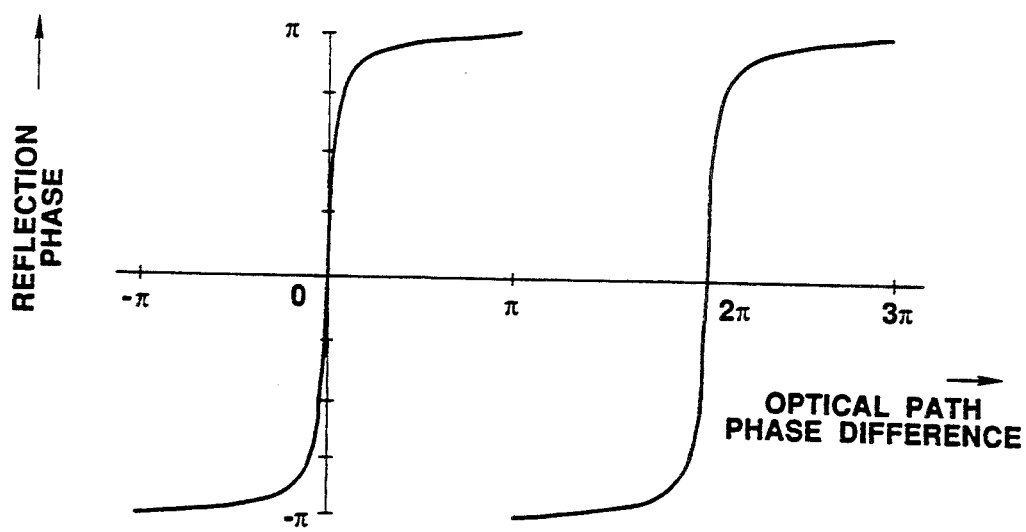
FIG. 3 is a graph showing changes in the phase of reflection with respect to the optical path phase difference of the resonator employed in the embodiment shown in FIG. 1.

In general, if a non-linear optical element having refractive index n and a thickness L is present within a Fabry-Perot resonator, the optical path phase difference $\Delta$ is $4\pi nL/\lambda$. If the single-pass transmittance is T, the single-pass SHG conversion efficiency is $\eta$, the reflectance at the incident surface is R1 and the reflection at the outgoing surface is R2, the complex reflection r becomes $$r = \frac{\sqrt{R_l} - \sqrt{R_m}\, e^{i\Delta}}{1 - \sqrt{R_l R_m}\, e^{i\Delta}} \tag{1}$$

where $R_m = R_2(T(1-\eta))^2$. The absolute value of r (power reflection) and the phase (reflection phase) are shown in FIGS. 2 and 3, respectively. By taking advantage of these phase changes, the values of the resonant frequency of of the external resonator 15 and the frequency fc of the fundamental wavelength laser light source 11 are brought into a relationship of an integer number times multiple relative each other.

The laser light beam of the laser light source 11 having the frequency fc of e.g. about 500 to 600 THz is phase-modulated by phase modulator 12 with the frequency fm of 10 MHz, such that a side band fc±fm is produced. An error signal exhibiting polarities is obtained by detecting the beat between the frequencies of fc and fc±fm of the return light from the external oscillator having the resonant frequency of f0.

That is, with the electric field E of the fundamental wavelength laser light source 11 of $E_0 \exp(i\,\omega_c\, t)$, the electrical field after the modulation becomes $E_0 \exp(i\,(\omega_c\, t + \sin(\omega_m\, t)))$, where $\omega_c$ is an angular frequency of the fundamental wavelength laser light, $\omega_m$ is an angular frequency of the modulation signal of the phase modulator 12 and $\beta$ is the modulation index. If the modulation index is sufficiently small such that $\beta < 0.2$, it suffices to take account of $\omega_c$ and two sidebands $\omega_c \pm \omega_m$. Consequently, we obtain the following formula (2)

$$E = E_0[J_0(\beta)e^{i\omega_c t} + J_1(\beta)e^{i(\omega_c+\omega_m)t} - J_1(\beta)e^{i(\omega_c-\omega_m)t}] \tag{2}$$

where J0 $(\beta)$ and J1$(\beta)$ are Bessel functions of the first and second orders, respectively.

Since the complex reflections for $\omega c$ and two sidebands $\omega c \pm \omega m$ modify the respective terms, the electric field of the reflected light from the external resonator 15 becomes $$E = E[J_0(\beta)I(\Delta_c)e^{i\omega_c t} + I_1(\beta)I(\Delta_{c+m})e^{i(\omega_c+\omega_m)t} - J_1(\beta)I(\Delta_{c-m})e^{i(\omega_c-\omega_m)t}]$$

but $$\Delta_c = \frac{4\pi n L}{\lambda_c} = \frac{2nL\omega_c}{v_c}, \tag{3}$$

$$\Delta_{c+m} = \frac{2nL(\omega_c + \omega_m)}{v_c},$$

$$\Delta_{c-m} = \frac{2nL(\omega_c - \omega_m)}{v_c}$$

Since $\beta < 0.2$, $$J_0(\beta) \approx \sqrt{(1 - \beta^2/2)}$$

and J1 $(\beta) \approx \beta/2$, the following formula is true (4)

$$E = E_0 \left[ \sqrt{1 - \frac{\beta^2}{2}}\, r(\Delta_c)e^{i\omega_c t} + \frac{\beta}{2}(r(\Delta_{c+m})e^{i(\omega_c+\omega_m)t} - r(\Delta_{c-m})e^{i(\omega_c-\omega_m)t}) \right] \tag{4}$$

Therefore, if the terms of the second and higher orders of disregarded, the intensity $|E|^2$ becomes $$|E|^2 = EE^{(*)} = \tag{5}$$

$$E_0^2 \left[ |r(\Delta_c)|^2 + \frac{\beta}{2}[r(\Delta_c)r^{(*)}(\Delta_{c+m})e^{-i\omega_m t} + r^{(*)}(\Delta_c)r(\Delta_{c+m})e^{i\omega_m t}] \frac{\beta}{2} [r(\Delta_c)r^{(*)}(\Delta_{c-m})e^{i\omega_m t} + r^{(*)}(\Delta_c)r(\Delta_{c-m})e^{-i\omega_m t}] \right] =$$

$$A(\Delta_c, \Delta_{c\pm m})\cos(\omega_m t) + B(\Delta_c, \Delta_{c\pm m})\sin(\omega_m t) + E_0^2|r(\Delta_c)|^2$$

but $$A(\Delta_c \Delta_{c\pm m}) = \beta E_0^2 Re\{I(\Delta_c)I^{(*)}(\Delta_{c+m}) - I(\Delta_c)I^{(*)}(\Delta_{c-m})\} \tag{6}$$

$$B(\Delta_c \Delta_{c\pm m}) = \beta E_0^2 Im\{I(\Delta_c)I^{(*)}(\Delta_{c+m}) + I(\Delta_c)I^{(*)}(\Delta_{c-m})\} \tag{7}$$

Synchronous detection of the reflected light with a suitable phase being given to the original modulation signal (with the angular frequency $\omega_m$) gives the above formulas (6) and (7) which are the coefficients of $\cos(\omega_m t)$ and $\sin(\omega_m t)$. The abovementioned error signal may be obtained from the formula (7) which is the coefficient of $\sin(\omega_m t)$.

Figure 4:
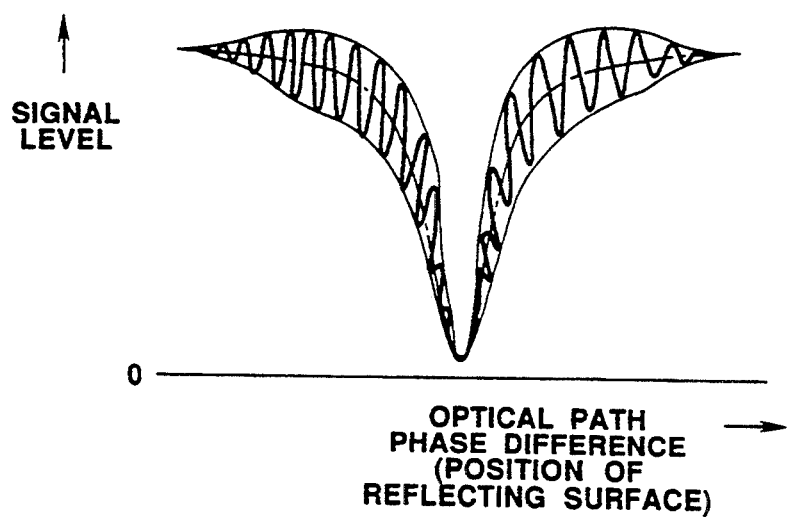
FIG. 4 is a waveform diagram showing detection signals of the reflected light beam from the resonator.
Figure 5:
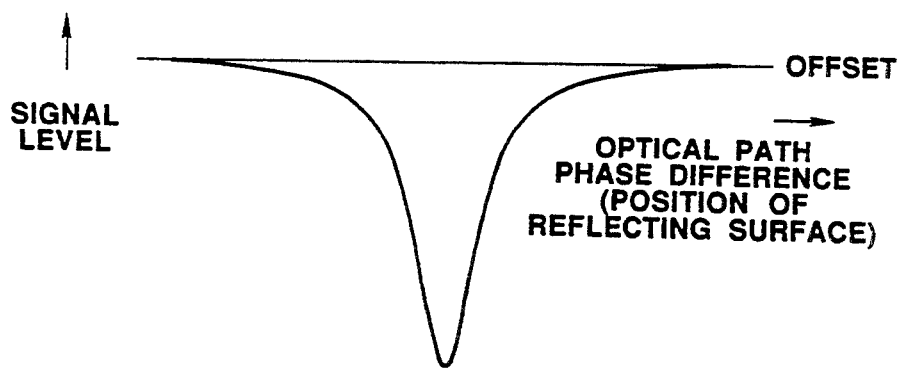
FIG. 5 is a waveform diagram showing a power component of the reflected light beam detection signals.
Figure 6:
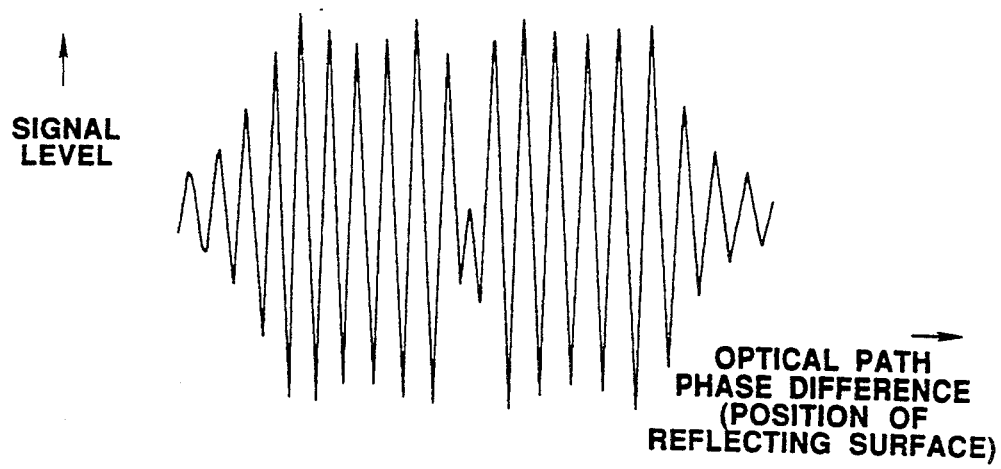
FIG. 6 is a Waveform diagram showing modulated signal component of the reflected light beam detection signals.
Figure 7:
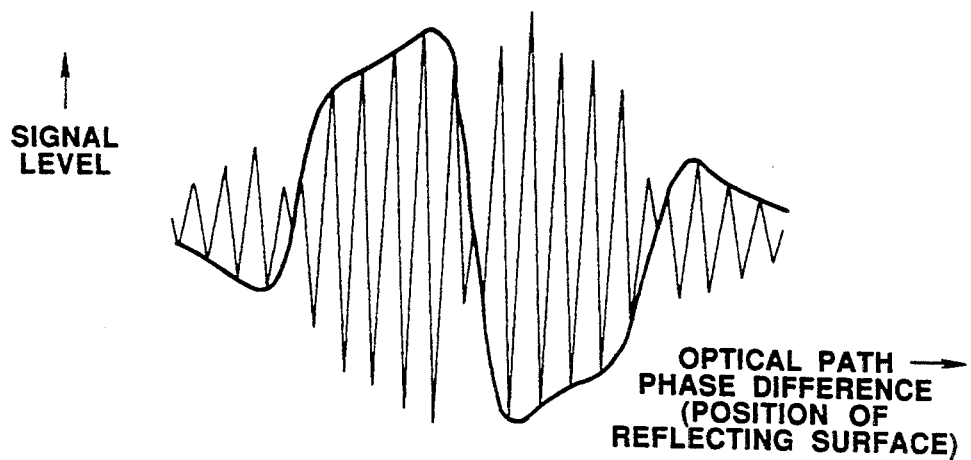
FIG. 7 is a waveform diagram showing a $\sin(\omega_m t)$ of the modulated signal component of the reflected light beam detection signals.
Figure 8:
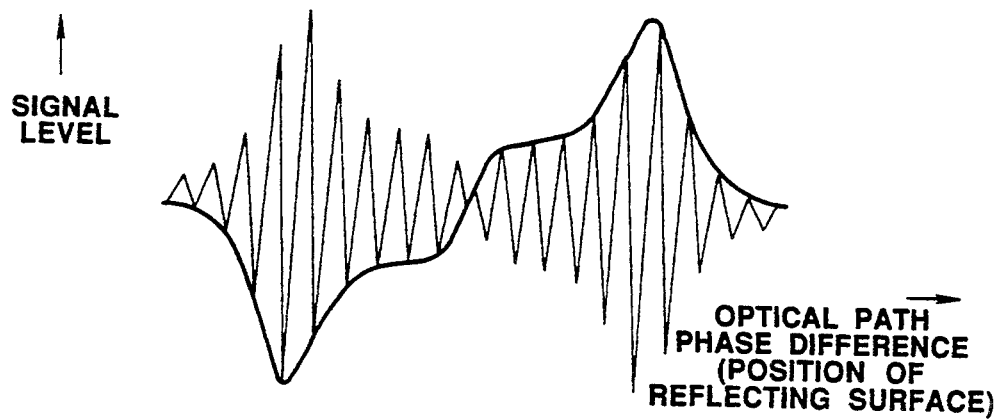
FIG. 8 is a waveform diagram showing a $\cos(\omega_m t)$ of the modulated signal component of the reflected light beam detection signals.

That is, FIG. 4 shows a detection signal of the return light (reflected light) from resonator 16 in FIG. 1 as detected by the photodetector 23 in FIG. 1. This detection signal is a signal component of FIG. 5 as an intensity signal of the reflected light superimposed on a signal component of FIG. 6 corresponding to the modulation signal. The modulation signal component of FIG. 6 may be taken out by transmission through a band-pass filter having a center transmission frequency of 10 MHz which is the above-mentioned modulation signal frequency. If the modulation signal component of FIG. 6 is multiplied by a signal which affords a suitable phase to the original modulation signal, and synchronous detection is performed, the signal component sin ($\omega_m t$) as shown in FIG. 7 is obtained. If the signal is freed of the modulation carrier frequency of 10 MHz by the low-pass filter, the error signal shown by a thick line of FIG. 7, that is the signal of the formula (7), is obtained. Meanwhile, FIG. 8 shows, for reference sake, the signal component of the cos ($\omega_m t$) and the signal of formula (6).

Figure 9:
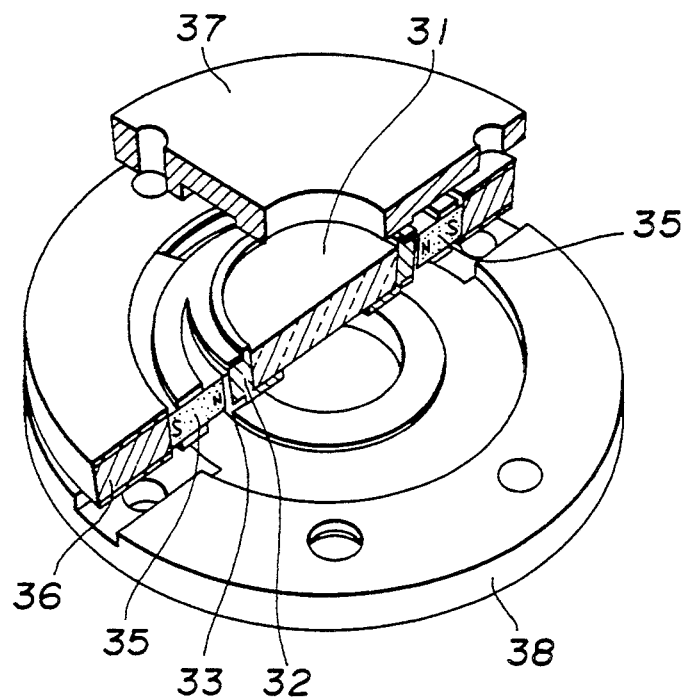
FIG. 9 is a perspective view showing a concrete example of an electromagnetic actuator, with portions thereof being broken away.

FIG. 9 shows, in a perspective view, a typical structure of the electromagnetic actuator 19 in FIG. 1.

Figure 10:
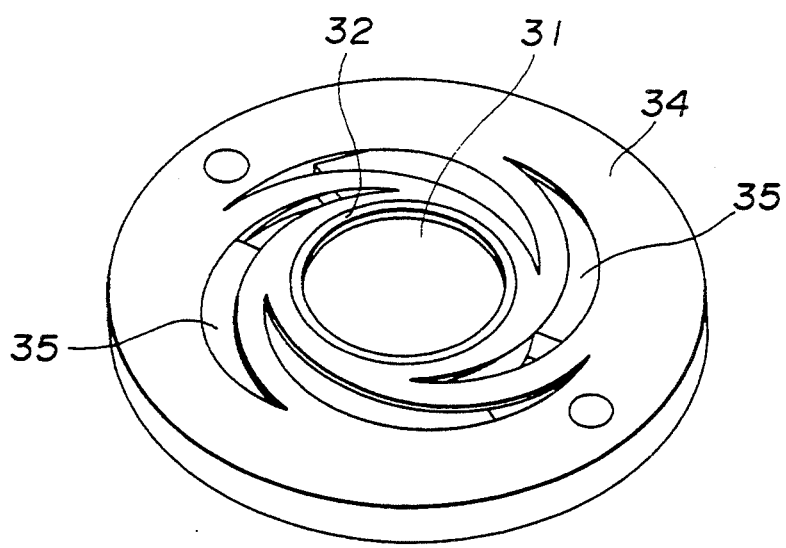
FIG. 10 is a schematic perspective view showing a spiral spring plate employed in the electromagnetic actuator shown in FIG. 9.

Referring to FIG. 9, the reflective surface 17 of FIG. 1 is formed, such as by coating, on a reflective mirror 31, which is fitted on a ring-shaped or cylindrically-shaped coil bobbin 32 formed of a ceramic or the like insulating material. A coil (so-called voice coil) 33 is wound in the form of a solenoid around the coil bobbin 32. This coil bobbin 32 is mounted on spirally-shaped spring plates 33, as shown in FIG. 10. The spirally-shaped spring plates 34 are secured to and supported by a ring-shaped yoke 36 via a permanent magnet 35. The magnet 35 is mounted for encircling the cylindrically-wound coil 33 of the coil bobbin 32 and is magnetized so that its inner periphery is the N pole and its outer periphery is the S pole. The magnet 35 has its outer periphery secured to a yoke 36 of iron or the like ferromagnetic material. The spring plates 34 are secured, such as by adhesion, to the upper and lower surfaces of the coil bobbin 32. The outer periphery of each of the spring plates 34 has its outer periphery supported by the yoke 36. The above-mentioned components are sandwiched between shield plates 37, 38 of iron or the like ferromagnetic material. These shield plates 37, 38 also play the part of a return path for the magnetic flux from the magnet 35 in cooperation with the yoke 36. The totality of the components are surrounded by the shield plates 37, 38 for ease of handling.

With the electromagnetic actuator, arranged and constructed as shown in FIGS. 9 and 10, the magnetic circuit has a substantially closed magnetic path, despite the fact that an electrically conductive material or a magnetic material is not provided within the coil 33. Characteristics exhibiting a large thrust (driving force) along the optical axis and less phase deviations may be obtained. On the other hand, the coil bobbin 32 is formed of ceramics to diminish the weight of the moving components, so that the double resonant frequency may be set to 100 kHz or higher.

Figure 11:
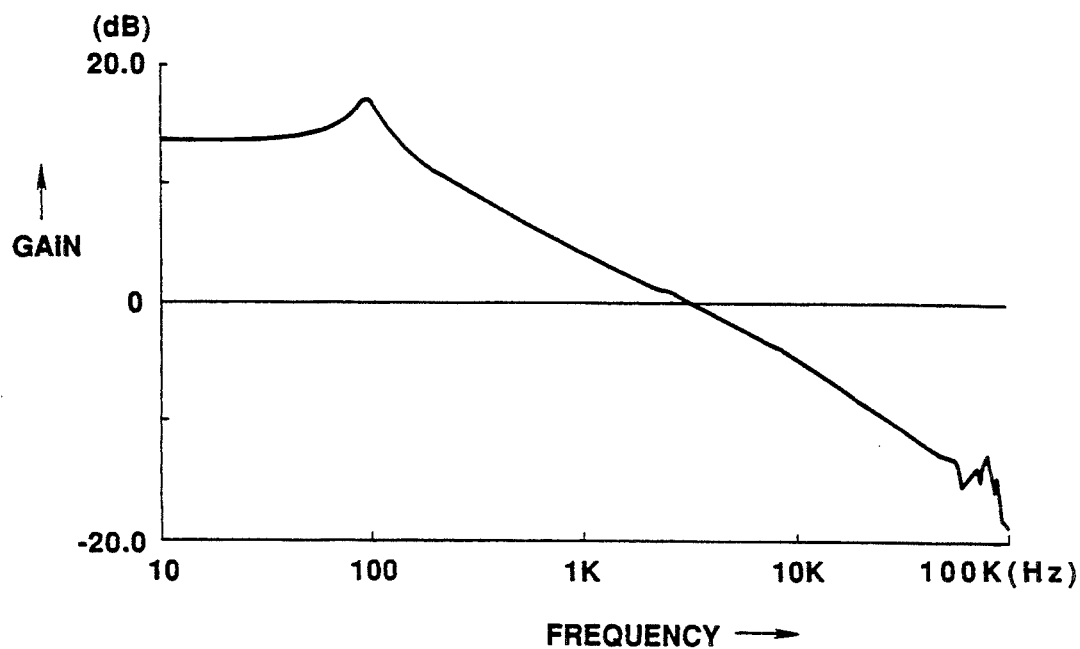
FIG. 11 is a Bode diagram showing the gain of transmission characteristics of the actuator shown in FIG. 9.
Figure 12:
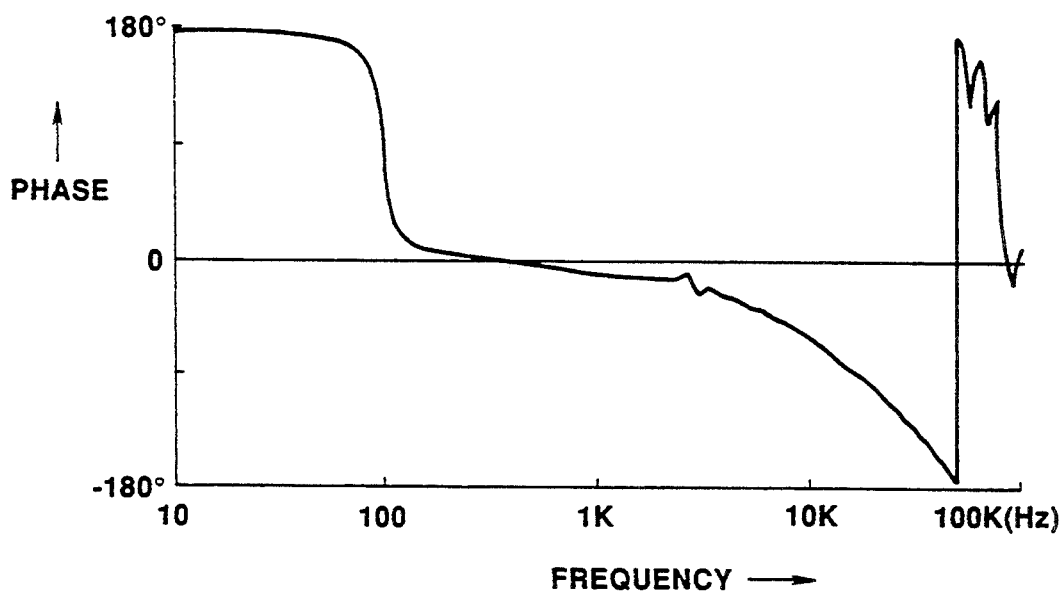
FIG. 12 is a Bode diagram showing the phase of transmission characteristics of the actuator shown in FIG. 9.

FIGS. 11 and 12 are Bode diagrams showing transmission characteristics of a tentatively produced electromagnetic actuator. Specifically, FIGS. 11 and 12 show the gain and the phase, respectively. A mirror holder (coil bobbin 32) of the actuator is formed of ceramics, with the resistance, inductance and weight of the actuator being 8 Ω, 570 µH and 1.25 g, respectively, and the spring constant and viscosity coefficient of the spring plate 34 being 570 Nm/rad and 0.057 Nm/sec. In these figures, resonance is not noticed at 100 KHz and up to nearly 100 KHz of $f_0$. Phase deviations in the higher frequency range are caused by coil inductances.

Figure 13:
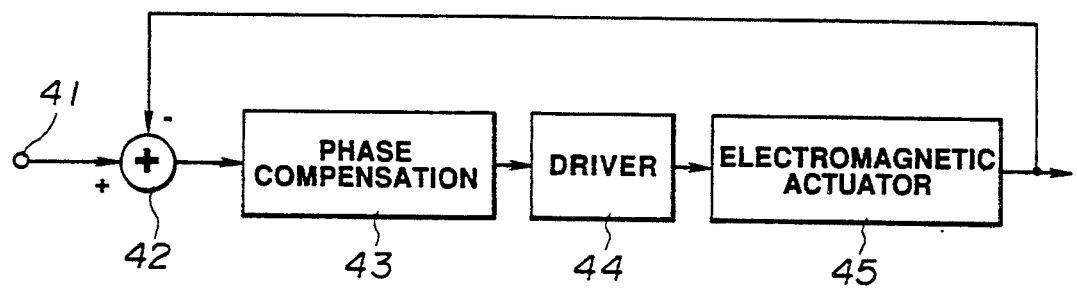
FIG. 13 is a block diagram showing a schematic arrangement of a servo control system.

FIG. 13 is a block diagram of a servo control system. In this figure, initial position or desired position setting signals are supplied at an input terminal 41 so as to be transmitted to a subtractor 42. An output signal from subtractor 42 is servo-phase-compensated at a phase compensator circuit 43 and converted at a driver 44 into a driving signal at a driver 44 which is supplied to the electromagnetic actuator 45. The driver 44 and the electromagnetic actuator 45 correspond to the driver 26 and the electromagnetic actuator 19, respectively, both in FIG. 1. The position of the reflective surface 17 in FIG. 1 of the resonator 15 in FIG. 1 along the optical axis is controlled by the electromagnetic actuator 45 and a position detection signal for the reflective surface position is transmitted as a subtraction signal to a subtractor 42 where it is subtracted from the desired position signal to produce a position error signal corresponding to the error signal shown in FIG. 7.

Figure 14:
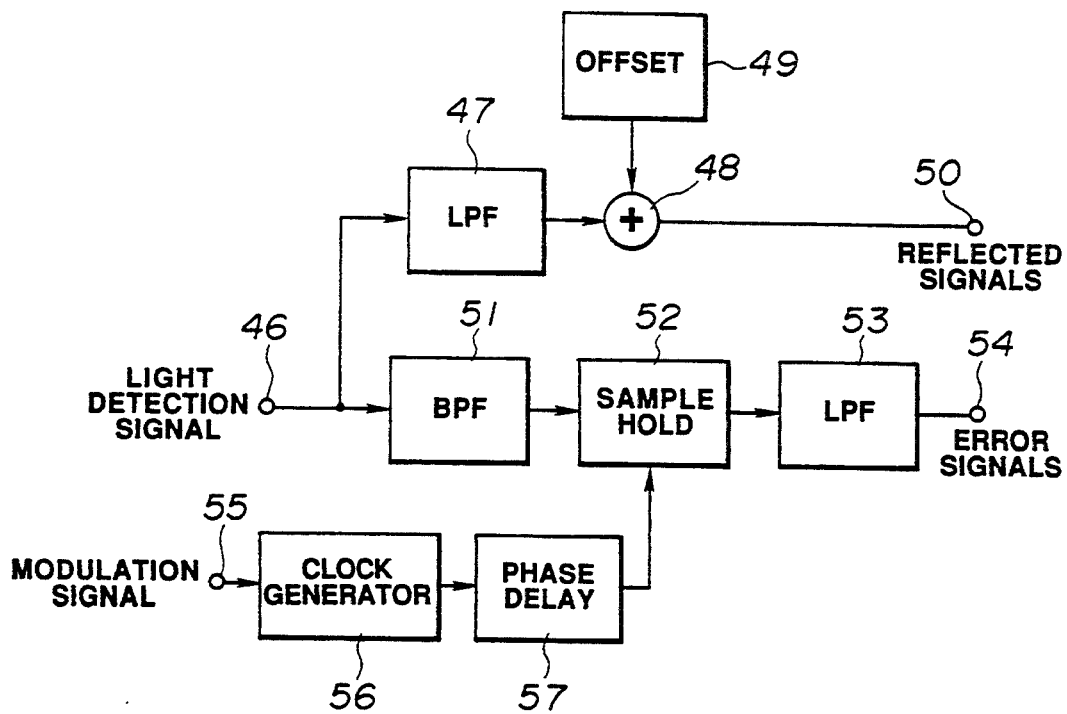
FIG. 14 is a block diagram showing a schematic arrangement of the circuitry for detecting error signals in the optical path length of the resonator.

FIG. 14 shows, in a block diagram, a typical arrangement for detecting the error signal. In this figure, a reflected light detection signal from a photodetector 23 shown in FIG. 4 is supplied at an input terminal 46 to a low-pass filter (LPF) 47 where it is freed of the above-mentioned modulation carrier component. An output signal from the LPF 47 is supplied to an additive node 48 where it is added to an offset DC level from an offset output circuit 49 to produce a reflection signal (reflected light intensity signal) as shown in FIG. 5 so as to be taken out at an output terminal 50.

On the other hand, the reflected light detection signal, supplied to the input terminal 46, is transmitted through a bandpass filter (BPF) 51 where the phase-modulated carrier frequency, such as fm=10 MHz, is taken out and supplied to a sample-and-hold circuit 52 where a processing comparable to synchronous detection is performed to take out the term of sin ($\omega_m t$) in formula (5). Besides, the modulation carrier component is removed by the low-pass filter (LPF) so that the component of the coefficient of sin ($\omega_m t$) as shown in FIG. 7 is output at an output terminal 54. The modulating signal (fm=10 KHz) from the oscillator 21 supplied to the input terminal 55 is a waveform shaped by a clock generator 56 into pulse signals which are delayed by a predetermined phase of, for example, 90 degrees, and supplied to the sample-and-hold circuit 52. The carrier frequency component from the BPF 51 is sample-held by the phase-delayed modulation signal to perform a synchronous detection of taking out the above-mentioned sin ($\omega_m t$) signal component.

Figure 15:
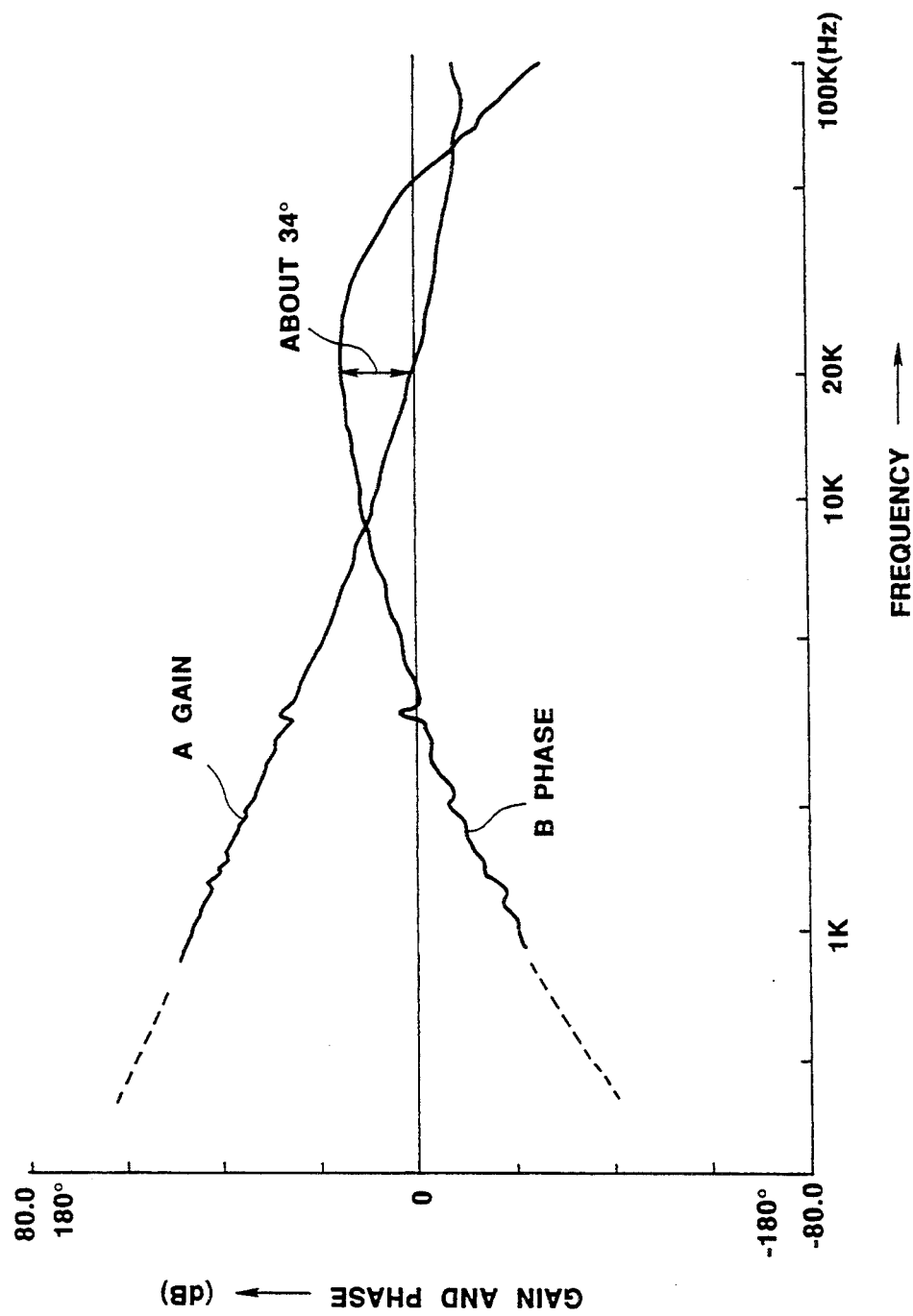
FIG. 15 is a Bode diagram showing frequency characteristics of a closed loop servo system.

FIG. 15 is a Bode diagram showing closed-loop characteristics of an entire system inclusive of the servo circuit shown in FIG. 13 when the electromagnetic actuator explained in connection with FIGS. 9 to 12 is employed. In this figure, curves A and B represent the gain and the phaser respectively. The cut-off frequency may be raised to 20 KHz, by adjusting the gain in the electric circuit. The phase margin at this time is about 34 meaning that a stable closed loop system may now be realized.

Figure 16:
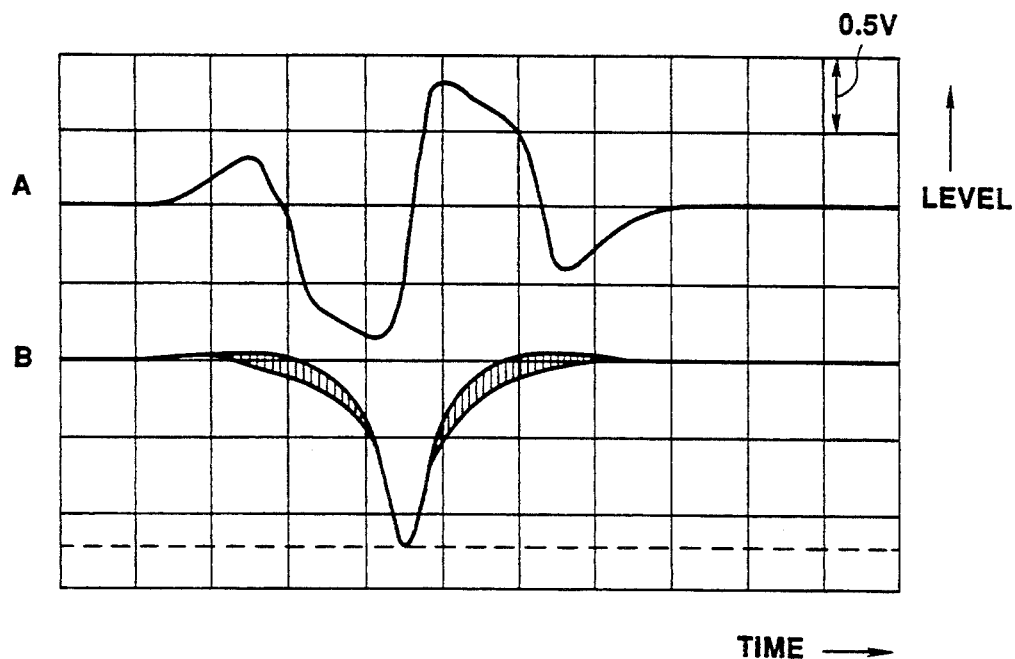
FIG. 16 is a waveform diagram showing error signals and reflected light beam detection signals when the reflecting surface of the resonator is deviated along the optical axis without servo control.
Figure 17:
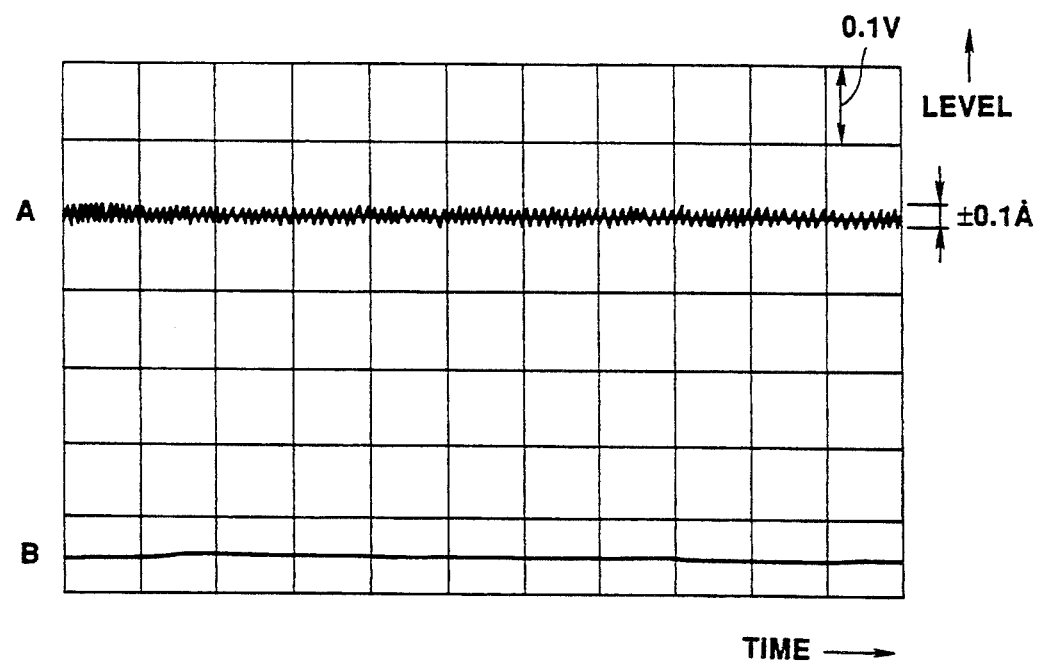
FIG. 17 is a waveform diagram showing error signals and reflected light beam detection signals under a servo control operation.

FIG. 16 shows an error signal (A) and a reflected light detection signal (B) when the electromagnetic actuator is driven without servo control for deviating the reflecting surface 66 along the optical axis, with a peak-to-peak distance of the error signal (A) being about 1 Å. FIG. 17 shows the error signal (A) and the reflecting light detection signal (B) when the closed loop servo are applied. It is seen that fluctuations of the error signal (A) is suppressed to not more than ±0.1 Å while the reflected light detection signal (B) is approximately zero so that substantially all of the laser light beam has been introduced into the external resonator 15.

Figure 18:
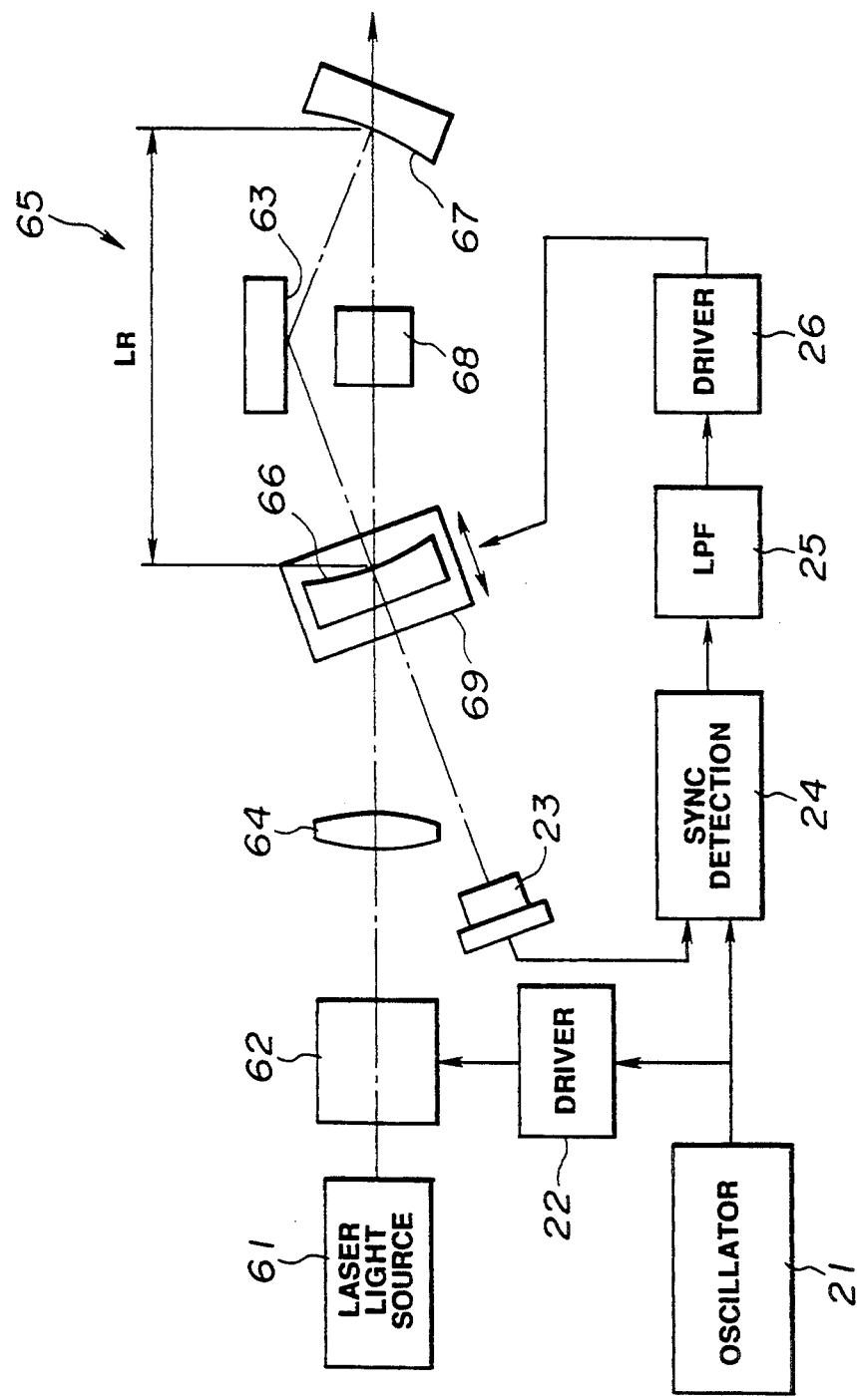
FIG. 18 is a schematic block diagram showing another embodiment of the laser light beam generating apparatus according to the present invention.

FIG. 18 shows a modification of a laser light emitting apparatus according to the present invention, in which the laser light beam of the fundamental wavelength, radiated from a laser light source 61, is phase-modulated by a phase modulator 62 so as to be incident via a light converging lens 64 to an external resonator 65. The external resonator 65 is made up of a reflective surface 66 of a concave mirror, a reflective surface 67 of a concave mirror 67, and a non-linear optical crystal element 68 arranged therebetween, so that an optical path of a resonator 65 is defined by these reflective surfaces 66, 67 and the reflective surface 63 of the plane mirror. The resonator is operated in resonance when the optical path length $L_R$ of the resonator 65 is changed such that the optical path phase difference becomes equal to an integer number times $2\pi$ so that the reflection and the reflection phase are changed acutely. The reflective surface 66 of the resonator 65 is driven along the optical path by the electromagnetic actuator 69.

The arrangement from the oscillator 21 to the driver 26 is the same as that of the embodiment shown in FIG. 1, so that description is omitted for brevity. The electromagnetic actuator 69 may be arranged and constructed as shown in FIGS. 9 and 10. The operation of the various components is similar to that of the above-described embodiment and hence the description is again omitted for brevity.

The laser light beam generating apparatus according to the present invention may be designed in many ways other than in the above-described embodiments. Several basic arrangements of the laser light generating apparatus according to the present invention are hereinafter explained by referring to FIGS. 19 to 23.

Figure 19:
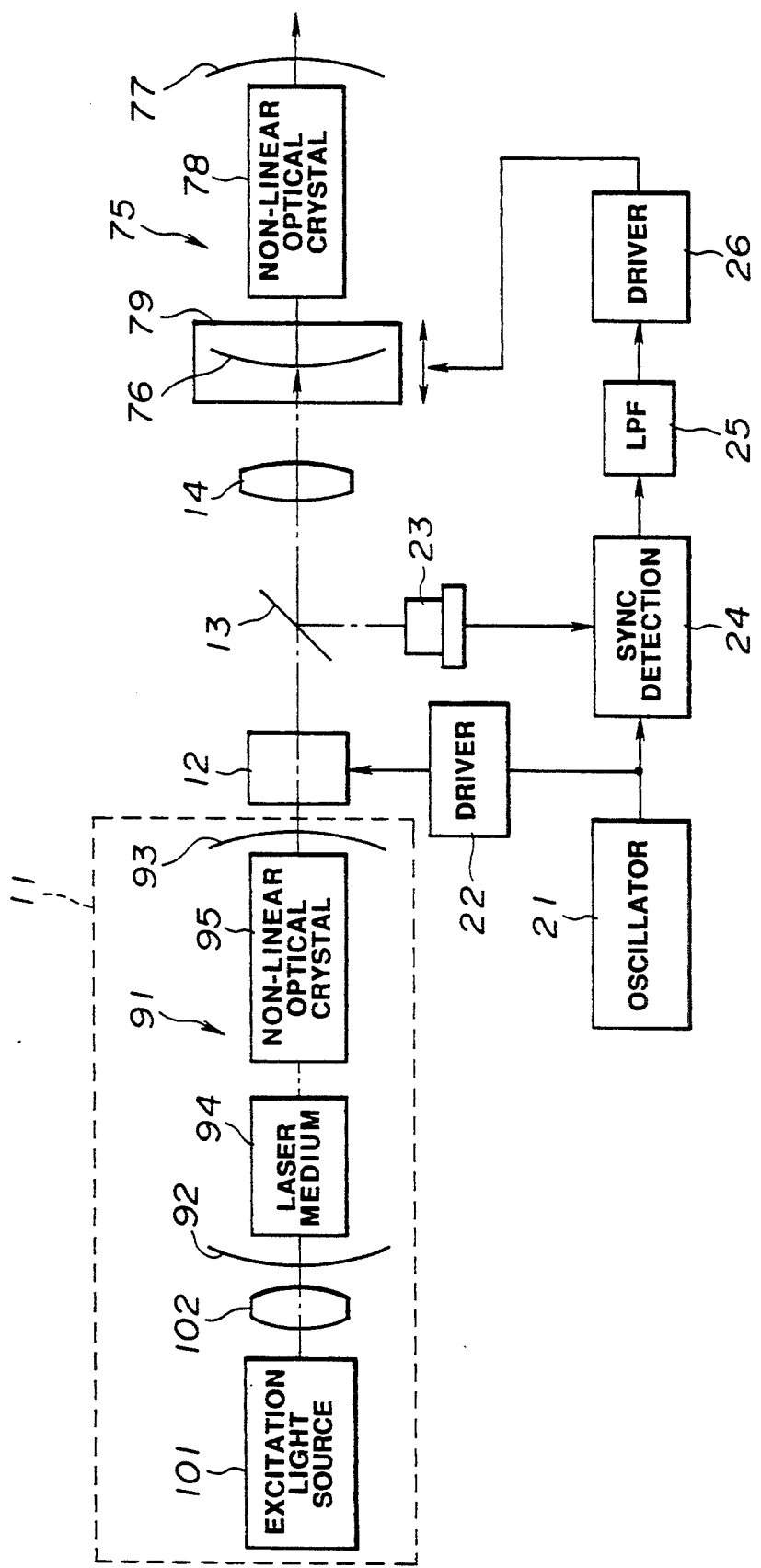
FIG. 19 is a schematic block diagram showing an example of a first basic arrangement of the laser light beam generating apparatus according to the present invention.

FIG. 19 shows a first basic arrangement of the present invention in which a so-called SHG laser resonator as a solid-state laser resonator is employed as a laser light source 11 shown in FIG. 1. Referring to FIG. 19, a resonator 91 for SHG laser light beam generation includes a laser medium 94, such as Nd:YAG, and a non-linear optical crystal element 95, such as KTP (KTiOPO$_4$), arrayed between a pair of reflecting surfaces 92, 93. An excitation light beam, radiated from an excitation light source, such as a semiconductor laser 101, is converged via a light converging lens 102 on the laser medium 94 of the resonator 91. The laser light beam having the fundamental wavelength of 1064 nm, for example, is radiated from the laser medium 94 and transmitted through the non-linear optical crystal element 95 for resonation within the resonator 91 for generating the SHG laser light beam of the wavelength of 532 nm. The SHG laser light beam is phase-modulated by a phase modulator 12 shown in FIG. 1 and caused to be incident via a reflecting surface 13 for detecting the reflected light beam from the resonator and via the light converging lens 14 into an external resonator 75. One of the reflecting surfaces 76, 77 of the external resonator 75, for example, the reflecting surface 76, is driven along the optical axis in a controlled manner by the electromagnetic actuator 79. Within the external actuator 75, a laser light beam having the wavelength of 266 nm, which is the second harmonic of the incident laser light beam, that is the fourth harmonic of the original laser light beam with the wavelength of 1064 nm, is generated and taken out of the external resonator 75. The arrangement of the oscillator 21, the driver 22, the photodetector 23, the synchronous detection circuit 24, the low-pass filter (LPF) 25 and the driver 26 is the same as the above-described first embodiment and hence the explanation is omitted for simplicity.

Figure 20:
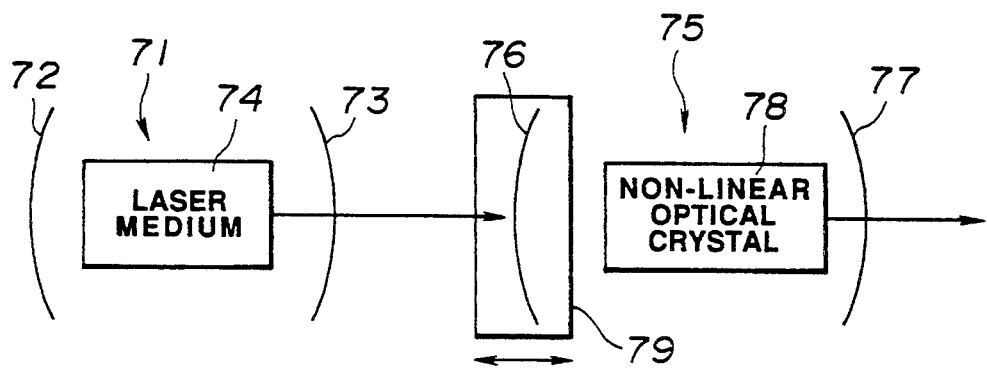
FIG. 20 is a schematic block diagram showing an example of a second basic arrangement of the laser light beam generating apparatus according to the present invention.

FIG. 20 shows a second basic arrangement of the present invention in which a solid-state laser resonator having a pair of reflective surfaces 72, 73 and a laser medium 74, of such as Nd:YAG etc arranged therebetween is employed as the above-mentioned laser light source. In this resonator, the laser light beam of the fundamental wavelength of 1064 nm, for example, is introduced from the laser light source through a non-linear optical crystal element 78, such as lithium niobate (LiNbO$_3$) arranged between the reflective surfaces 76, 77 of the external resonator 75 for generating second harmonics having the wavelength of 532 nm. One of the reflective surfaces of the external resonator 75, such as the reflective surface 76, is position-controlled along the optical axis by the above-mentioned electromagnetic actuator 79.

Figure 21:
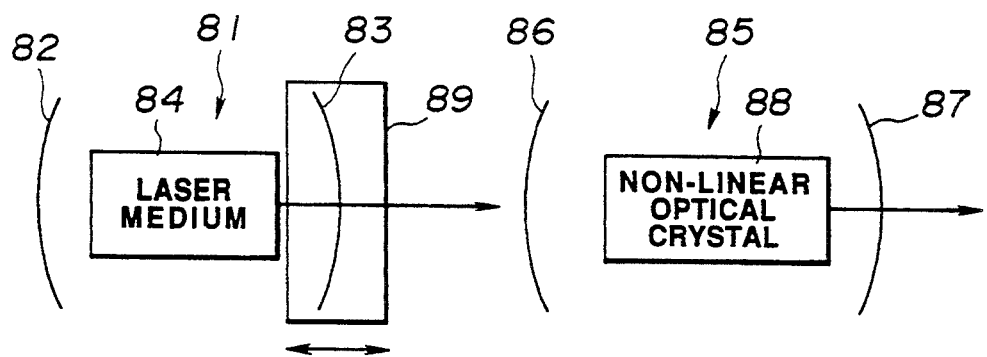
FIG. 21 is a schematic block diagram showing an example of a third basic arrangement of the laser light beam generating apparatus according to the present invention.

FIG. 21 shows a third basic arrangement of the present invention in which a solid-state laser resonator having a pair of reflective surfaces 82, 83 and a laser medium 84 of such as Nd:YAG etc arranged therebetween is employed as the above-mentioned laser light source, and in which the laser light beam of the fundamental wavelength of 1064 nm, for example, is introduced from the laser light source through a non-linear optical crystal element 88, such as lithium niobate (LiNbO$_3$) arranged between the reflective surfaces 86, 87 of the external resonator 85 for generating second harmonics having the wavelength of 532 nm. One of the reflective surfaces of the resonator 81, such as the reflective surface 83, is position-controlled along the optical axis by the above-mentioned electromagnetic actuator 89. With the present third basic arrangement, reflection of the laser light beam with respect to the external resonator 85 is changed by the oscillation frequency of the laser light beam of the fundamental laser light beam from the laser light source being changed, thereby establishing a stable state in which laser light beam introduction into the external resonator 85 is increased.

In these basic arrangements, shown in FIGS. 20 and 21, Nd:YVO$_4$, LNP, Nd:BEL, etc. may be used as the laser media 74, 84, in addition to Nd:YAG. The non-linear optical crystal elements 78, 88 may also be KTP, QPM LN, LBO or BBO besides LN.

Although not shown, one of the reflective mirrors of the SHG laser resonator as a laser light source may be driven by the electromagnetic actuator as in the case of the above-mentioned first basic arrangement. If the second harmonic generating type laser resonator generating the second harmonic laser light beam within the resonator is employed as a laser light source, and the laser oscillator is of the homogeneous line broadening as is the solid-state laser resonator, an oscillation of the polarization of the mode closest to the peak of the gain curve (gain frequency characteristic curve) is produced and the gain is saturated so that the single mode oscillation is produced. However, in effect, multi-mode oscillation is produced due to the hole burning effects. This is because the standing wave is present within the laser resonator 13 and the gain is not fully saturated at the node of the standing wave, as a result of which oscillations having a different mode are produced. Should longitudinal multi-mode be present in the same polarization mode of the laser light beam of the fundamental wavelength, there is a risk that the mode hop noise due to mode coupling in one and the same polarization mode tends to be produced within the same polarization mode.

In the specification and drawings of Japanese Patent Application No.2-125854, the present Assignee has proposed arranging an optical device inhibiting coupling of two polarization modes of the laser light beam of the fundamental wavelength due to generation of sum frequency, or a so-called etalon, within the laser resonator, or arranging the laser medium 16 in proximity to the quarter wave plate 15, for inhibiting the multi-mode oscillation due to the above-mentioned hole-burning effect. In the specification and drawing of the Japanese Patent Application No.3-17068, the present Assignee has also proposed providing an optical element inhibiting coupling of the two intrinsic polarization modes of the laser light of the fundamental wavelength, and an adjustment device or adjusting polarization so that the laser light beam of the fundamental wavelength propagated back and forth in the laser medium will become circular polarization. It is preferred to inhibit hole burning effects in the SHG laser resonator or to prevent the mode hop noise from being produced by the techniques disclosed in these Publications.

By setting the optical path length of the SHG laser light source so as to be an integer number times as large as the optical path length of the external resonator, the SHG laser light beam can be introduced efficiently into the external oscillator. This arrangement is required in order that the longitudinal modes of the SHG laser light beam, which are based on the two intrinsic polarization modes of the fundamental wavelength laser light beam produced by introducing a double refraction device such as a quarter wave plate in the resonator of the SHG laser light source adapted for establishing the so-called type II phase matching conditions between the fundamental wave laser light beam and the SHG laser light beam, will be introduced in their entirety into the external resonator. The multi-modes may be efficiently introduced by setting the optical path length of the SHG laser light source so as to be an integer number times that of the external resonator.

That is, by introducing the SHG laser light beam from the SHG laser resonator into the external resonator having an internal non-linear optical crystal element, in which the frequency difference of the longitudinal modes within the two polarization modes of the resonator having the internal non-linear optical crystal element is equal to an odd number multiple of one half the interval of the longitudinal resonance modes, and by setting the optical path length of the external resonator so as to be an integer number times the optical path length of the SHG laser resonator, two or more modes of the laser light beam from the SHG laser resonator may be simultaneously introduced into the external resonator to improve the multi-stage wavelength conversion efficiency.

Figure 22:
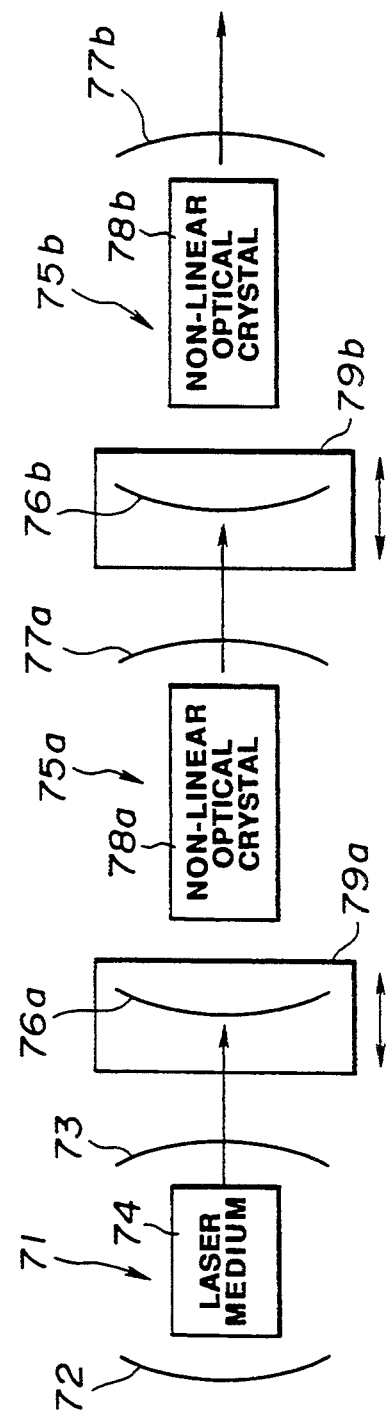
FIG. 22 is a schematic block diagram showing an example of a fourth basic arrangement of the laser light beam generating apparatus according to the present invention.

FIG. 22 shows a fourth basic arrangement of the solid-state laser resonator according to the present invention in which two external resonators 75a, 75b are arranged in series with each other. In the embodiment shown in FIG. 22, a laser light beam from the resonator 71 of the fundamental wave laser light beam having the wavelength of e.g. 1064 nm is introduced into a first external resonator 75a for converting the laser light beam into the SHG laser light beam having the wavelength of 532 nm by the non-linear optical crystal element 78a such as LiNbO3. The SHG laser light beam thus produced is introduced into a second external resonator 75b for converting the SHG laser light beam into the laser light beam of the fourth harmonic of 266 nm wavelength (FHG) by the non-linear optical effects of the non-linear optical crystal element 78b, such as BBO. One of the reflective surfaces 76a, 77a of the first external resonator 75a, such as the reflective surface 76a, is shifted along its optical axis by the electromagnetic actuator 79a, while one of the reflective surfaces 76b, 77b of the second external resonator 75b, such as the reflective surface 76b, is shifted along its optical axis by the electromagnetic actuator 79b, until the conditions concerning the optical paths of the resonators 71, 75a and 75b are satisfied.

Figure 23:
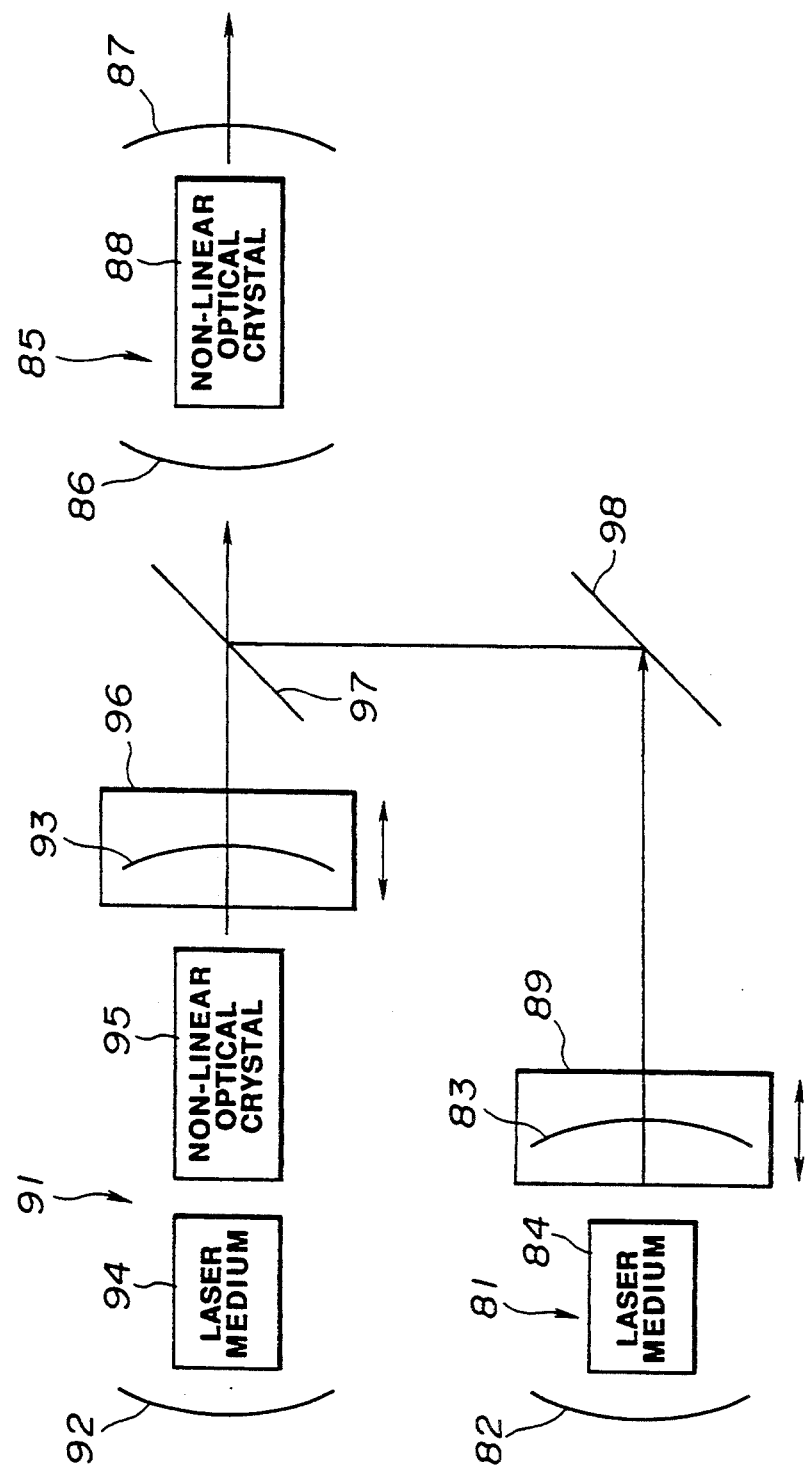
FIG. 23 is a schematic block diagram showing an example of a fifth basic arrangement of the laser light beam generating apparatus according to the present invention.

FIG. 23 shows a fifth basic arrangement of the present invention in which wavelength conversion is performed by so-called sum frequency mixing. That is, the SHG laser light beam of the wavelength of 532 nm from a laser resonator 91 as the aforementioned SHG laser light source as explained with reference to FIG. 19 is transmitted via a wave combining mirror 97, such as a dichroic mirror, to an external resonator 85. One of reflecting surfaces 92, 93 of the resonator 91 of the SHG laser light source, for example, the reflecting surface 93, is shifted along the optical axis by an electromagnetic actuator 96 such as the above-described electromagnetic actuators. The laser light beam from a laser resonator 81 as shown in FIG. 21 is transmitted to an external resonator 85 via a wave combining mirror 97 after deflection by a mirror (reflective surface) 98. In the external resonator 85, the laser light beam of 532 nm wavelength and the laser light beam of the 1064 nm wavelength are sum frequency mixed by the non-linear optical effect of the non-linear optical crystal element 88, such as an MMO element, for producing a laser light beam of, for example, the wavelength of 355 nm, which is outputted.

The present invention is not limited to the above-described embodiments. For example, the wavelength of the fundamental laser light from the laser medium of Nd:YAG may be 956 nm or 1318 nm, besides 1064 nm. The laser light source may also be a semiconductor laser, such as a laser diode, or a gas laser, such as He-Ne laser, besides the solid-state laser. The laser light beam from the light sources for sum frequency mixing as shown in FIG. 23 may also be the laser light beam from the external resonator as shown in FIG. 22.

What is claimed is:

1. A laser light beam generating apparatus comprising:
   at least one light beam source for emitting a light beam;
   a first reflector;
   a second reflector;
   a non-linear optical crystal element provided between said first and second reflectors, a light beam from said light beam source being incident on said non-linear optical crystal element through said first reflector; and
   actuating means for actuating at least one of said first and second reflectors along an optical axis of the light beam emitted from said light beam source, wherein said actuating means comprises a reflector supporting member for supporting said one reflector and an electromagnetic actuator for moving said one reflector supported by said supporting member and wherein said electromagnet actuator includes:

a ring shaped magnet surrounding said reflector supporting member;

a spring plate connected to said magnet; and a shield plate connected to said spring plate, said shield plate being formed from a ferromagnetic material.

2. An apparatus as recited in claim 1 further including a yoke surrounding said magnet, said yoke being formed from a ferromagnetic material.

3. A laser light beam generating apparatus comprising:

at least one light beam source for emitting a pumping light beam;

a first resonator including first and second reflectors and a laser medium into which the pumping light beam is incident from said light beam source through said first reflector;

a second resonator including third and fourth reflectors and a non-linear optical crystal element in which the light beam from the first resonator is incident through said third reflector; and actuating means for actuating at least one of said first, second, third and fourth reflectors along an optical axis of the light beam emitted from said first resonator, wherein said actuating means comprises a reflector supporting member for supporting said one reflector and an electromagnetic actuator for moving said one reflector supported by said supporting member, said electromagnet actuator includes:

a ring shaped magnet surrounding said reflector supporting member;

a spring plate connected to said magnet; and a shield plate connected to said spring plate, said shield plate being formed from a ferromagnetic material.

4. An apparatus as recited in claim 3 further including a yoke surrounding said magnet, said yoke being formed from a ferromagnetic material.

* * * * *